United States Patent

Carodiskey

[19]

[11] Patent Number: 6,035,717
[45] Date of Patent: Mar. 14, 2000

[54] METHOD AND APPARATUS FOR MEASURING THE THICKNESS OF A COATED MATERIAL

[75] Inventor: Thomas J. Carodiskey, County of Mifflin, Pa.

[73] Assignee: Krautkramer Branson, Inc., Lewistown, Pa.

[21] Appl. No.: 09/076,612

[22] Filed: May 12, 1998

[51] Int. Cl.[7] .................................................. G01N 29/00
[52] U.S. Cl. .............................................. 73/597; 73/600
[58] Field of Search .............................. 73/597, 598, 600, 73/609, 618, 620, 622, 579, 632

[56] References Cited

U.S. PATENT DOCUMENTS

| | | | |
|---|---|---|---|
| 4,539,847 | 9/1985 | Paap | 73/579 |
| 4,669,310 | 6/1987 | Lester | 73/597 |
| 4,817,430 | 4/1989 | Benes et al. | 73/579 |
| 4,918,989 | 4/1990 | Desruelles et al. | 73/627 |
| 5,038,615 | 8/1991 | Trulson et al. | 73/597 |
| 5,540,096 | 7/1996 | Woodcock et al. | 73/579 |
| 5,557,970 | 9/1996 | Abbate et al. | 73/597 |
| 5,777,230 | 7/1998 | Vandervalk | 73/632 |

*Primary Examiner*—Max Noori
*Attorney, Agent, or Firm*—Polster, Lieder, Woodruff & Lucchesi, l.c.

[57] ABSTRACT

A pipe (P) carries corrosive fluids (F). Ultrasonic measurements of the pipe's thickness are made with an instrument (10) to determine if it needs to be replaced. If the pipe is coated with a layer (L) of protective material (C), a time of flight (TOF) measurement is made to determine the velocity of ultrasonic pulses transmitted through the material from which the pipe is manufactured. A second measurement is made to determine the velocity of pulses through the coated pipe material. The pulse velocity is now a function of the coating thickness by knowing the two velocity values, the coating thickness is determined. An ultrasonic pulse measurement of the thickness of the coated pipe is then made. The coating thickness is then calculated by a processor (12) of the instrument. If the thickness value is less than a minimum thickness value (M), an indication is given that the pipe needs to be replaced.

23 Claims, 2 Drawing Sheets

METHOD AND APPARATUS FOR MEASURING THE THICKNESS OF A COATED MATERIAL

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to the use of ultrasonic measurement techniques, and more particularly, to the measurement of the thickness of a pipe or other conduit which is covered with a layer of coating to determine the remaining useful life of the pipe or conduit.

In a variety of industrial settings, pipes are used to conduit liquids and gases from one location to another. Many times these are corrosive fluids which, over time, will cause the pipes to have to be replaced. At the same time, it is not unusual for the pipes to painted with a coating material to protect the outside of the pipe from the weather, or from other materials in the atmosphere which would react with the pipe if the pipe comes into contact with the materials. As part of the maintenance required on a fluid flow system, it is desirable from time-to-time to measure the thickness of a pipe. If the measured thickness is less than some minimum value, then the pipe should be replaced. With coated pipes, however, there is a problem in that the layer of coating material effects the measured thickness value, causing errors in the value. If the error is such as to indicate that the conduit is thinner than it actually is, then the pipe is replaced before the actual end of its useful life, thereby unnecessarily increasing maintenance costs. If the error indicates the pipe is actually thicker than it actually is, then the pipe may fail before it can be replaced, not only needlessly shutting down the facility, but also incurring expensive cleanup costs.

Ultrasonic thickness measuring techniques are known. However, heretofore, it has not been possible to accurately measure pipe thickness when the pipe has been painted with a layer of a coating material. In accordance with the present invention, that is now possible.

BRIEF SUMMARY OF THE INVENTION

Among the several objects of the present invention may be noted the provision of a method and apparatus for accurately measuring the thickness of a pipe which is covered with a layer of a coating material to determine if the pipe is still usable, or if it is time to replace the pipe;

the provision of such a method and apparatus to achieve such a measurement without the need for special tools or equipment;

the provision of such a method and apparatus to employ time of flight (TOF) measurements for the pipe material and the coating used on the material to determine a thickness value for the layer of coating material;

the provision of such a method and apparatus to obtain a thickness value for the coated pipe and to combine the two measured thickness values to derive a thickness measurement just for the pipe;

the provision of such a method and apparatus which provides accurate pipe thickness measurements regardless of the type of coating applied to the pipe, the coating, for example, being a paint, epoxy, or RTV type material;

the provision of such a method and apparatus to provide such measurements through multiple layers of coating and the use of different materials in the different layers of coating; and, the provision of such a method and apparatus which can be used in a variety of industrial settings to provide pipe thickness measurements quickly and reliably.

In accordance with the invention, generally stated, a metal pipe or conduit carries corrosive fluids. Ultrasonic measurements of the pipe's thickness are periodically made to determine if it needs to be replaced. If the pipe is coated with a layer of material to protect the pipe, a method and apparatus of the invention are employed. A time of flight measurement is made to determine the velocity of ultrasonic pulses through the material. The velocity of the pulse is a function of the thickness of the coating. The velocity of a pulse through just the material with which the pipe is made is known. With this information the thickness of the coating is determined. An ultrasonic pulse measurement of the thickness of the pipe and its coating are then made. The coating thickness is then subtracted from the overall thickness to ascertain the pipe thickness. Other objects and features will be in part apparent and in part pointed out hereinafter.

BRIEF DESCRIPTION OF THE SEVERAL VIEWS OF THE DRAWINGS

In the drawings.

Corresponding reference characters indicate corresponding parts throughout the drawings.

DETAILED DESCRIPTION OF THE INVENTION

Figure 1:
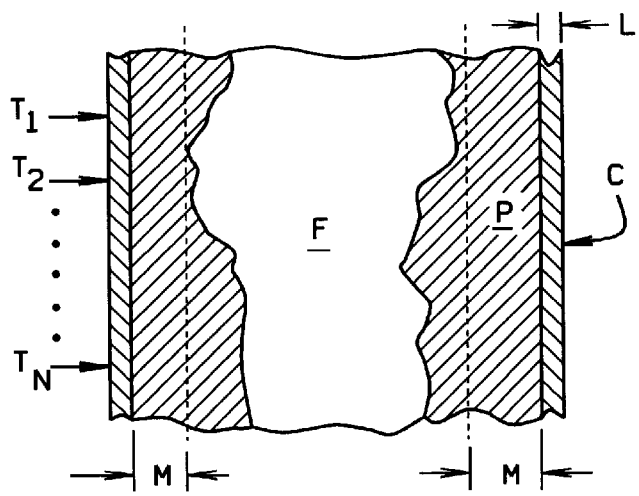
FIG. 1 is a cross-sectional view of a conduit having a layer of a coating material applied over its outer surface.

Referring to the drawings, a pipe or conduit P is used to flow fluids F from one location to another. The conduit can be made of metal such as cast iron, steel, or aluminum. The fluid, which may be a gas or a liquid, is typically a corrosive fluid which, over time, will eat away at the interior surface of the pipe as indicated in FIG. 1. Because of this, the thickness of the pipe is periodically tested. A series of thickness measurements are made at intervals along the length of the pipe, these being indicated T1–Tn in FIG. 1. If the thickness at any test site reveals that the wall thickness of the pipe is less than a minimum thickness M, then the pipe, or that section of the pipe will need to be replaced.

Figure 2:
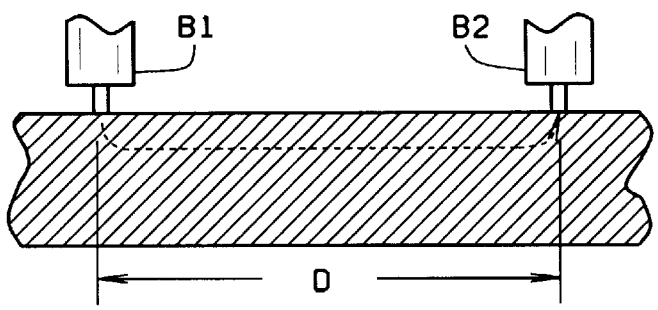
FIG. 2 is a sectional view of test specimen of the pipe on which tests are performed to determine the velocity of ultrasonic pulses propagated through the conduit.

As further shown in FIG. 1, it is not uncommon to coat the outer surface of the pipe with a layer L of a coating C to protect the pipe. However, the coating material (paint, epoxy, RTV) has heretofore made it difficult to obtain an accurate thickness measurement. It is known that ultrasonic waves propagate through different materials at different velocities. As shown in FIG. 2, a probe B1 is placed against an outer surface of a pipe made of a known material. A second probe B2 is placed a predetermined distance D from probe B1. Now, ultrasonic pulses are transmitted from probe B1 to probe B2, these pulses traveling through the outer surface of the pipe material. The time required for each pulse to travel between the probes is measured to obtain a time of flight (TOF) value. Since both the travel time and travel distance are known, the velocity V of the pulses traveling through the material is calculated as:

$$V=D/TOF$$

By making these measurements for the different types of material from which a pipe is made, a schedule can be created from which the velocity of ultrasonic pulse travel can be found by referring to the material from which the pipe is made.

Figure 3:
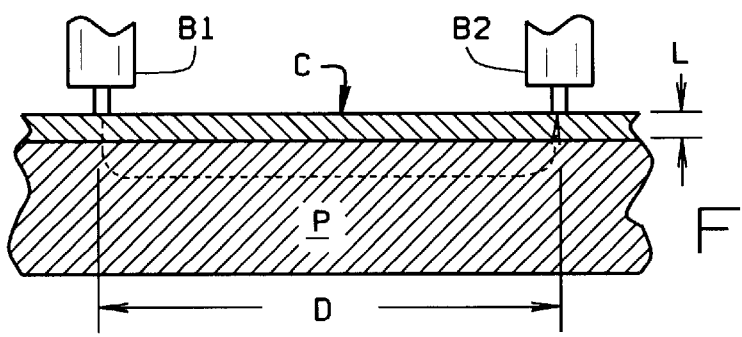
FIG. 3 illustrates a velocity test performed on the coated pipe to determine the thickness of the coating layer.

Referring to FIG. 3, for a coated pipe P, the same test is made as for the uncoated pipe made of the same material and described with respect to FIG. 2. Now, when the test is performed, a new ultrasonic pulse velocity V' is determined. The difference between the velocities V and V' is a function of the thickness of the coating layer L. That is, $$V'=(D+2L)/TOF',$$

where TOF' is the time required for ultrasonic pulses to travel between probes B1 and B2 for the coated pipe, and D+2L is the total distance of travel. The value 2L is used because the pulse must traverse the layer of coating material twice in its transit between the probes. With this information, the thickness L of the coating layer can now be determined. While the probes are shown in FIGS. 2 and 3 as being orthogonal to the outer surface of the pipe, in actuality, the probes are angled with respect to the pipe surface. While this means that the actual path of the ultrasonic waves through the coating is somewhat longer than the actual coating thickness, the difference is readily accounted for in the signal processing.

Figure 4:
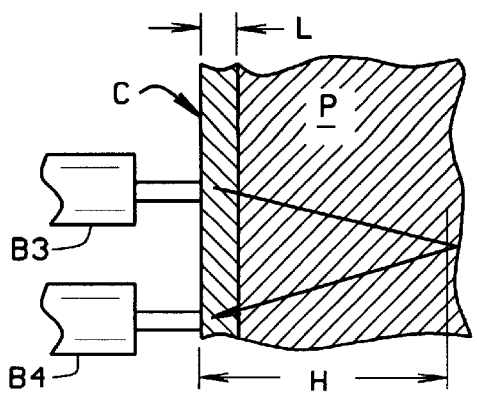
FIG. 4 illustrates a thickness measurement made on the conduit and from which an actual thickness value will be determined; and, FIG. 5 is a simplified representation of an instrument used to perform thickness measurements on coated pipes.

In FIG. 4, probes B3 and B4 are used to measure the total thickness H of pipe P including the thickness of the coating layer. Ultrasonic measurement techniques used to measure material thickness' are known in the art and will not be described herein. Once the value for thickness H has been determined, the layer of thickness L is subtracted from the value to arrive at the actual thickness of the pipe at the point of measurement. This value is now compared against the minimum thickness value M. If the pipe thickness is less than the minimum thickness value, an indication is given to indicate that the pipe should be replaced.

Figure 5:
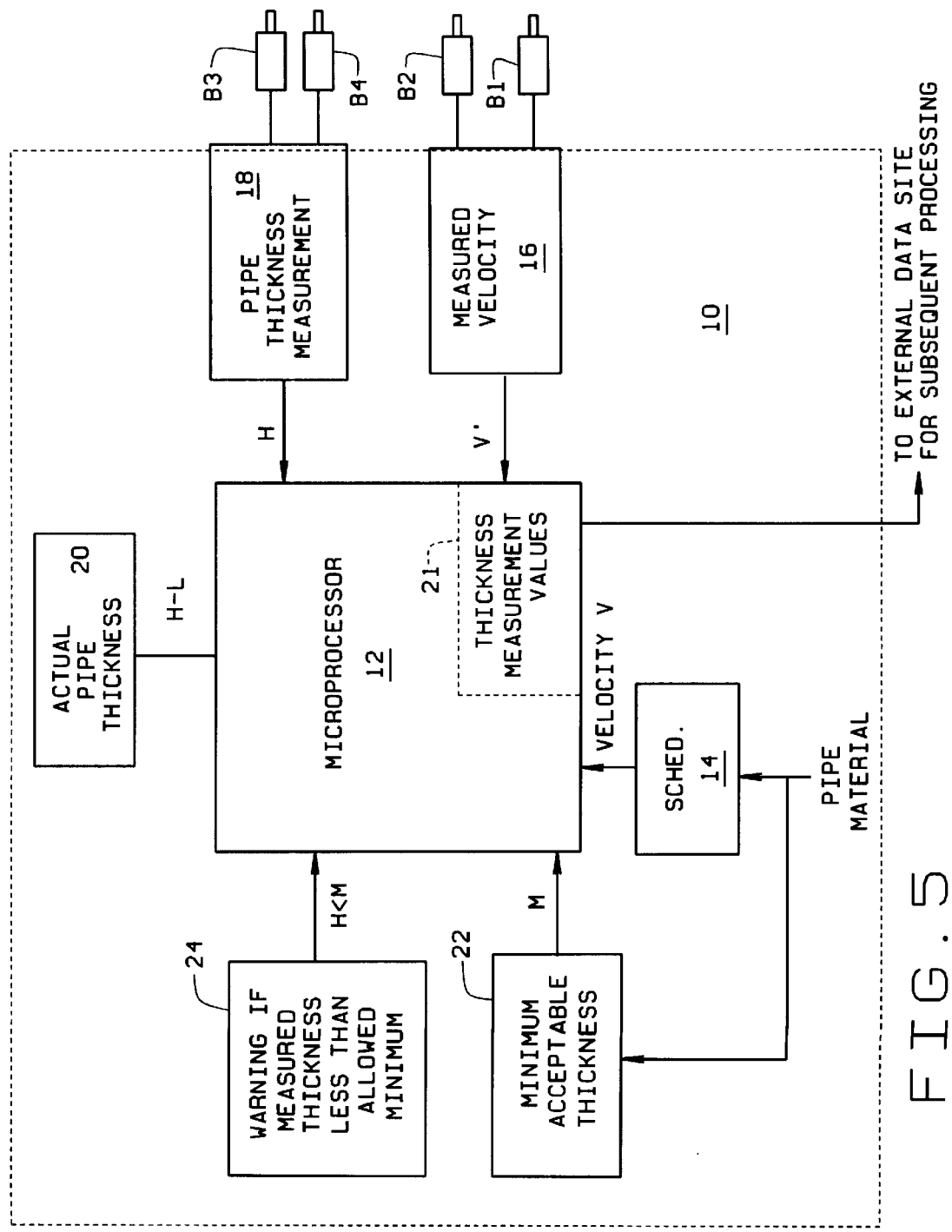

Referring to FIG. 5, apparatus of the present invention includes an instrument 10 for performing thickness measurements on coated pipes. Instrument 10 includes a microprocessor 12 for performing the calculations required to determine both the thickness of coating layer L, as well as the actual thickness of pipe P. Instrument 10 includes a memory module 14 in which is stored velocity values for the propagation rates of ultrasonic pulses through different materials from which pipe P is made. At the beginning of a test, the technician enters the type of material as an input to module 14, and the corresponding velocity value V is provided to microprocessor 12 from the memory.

At each location where a thickness test is performed, the technician first performs a velocity test, using probes B1 and B2, to determine the velocity V' for the coated material. A measured velocity module 16 provides the velocity value V' to the microprocessor which uses the two velocity values V and V' to calculate the thickness of coating layer L at that location. It will be understood that the thickness of layer L may not be uniform over the length of pipe P so a layer thickness measurement should be made at each test location.

A thickness measurement using probes B3 and B4 is also made at the location to determine the overall pipe thickness H at the test site. A module 18 supplies this thickness value to microprocessor 12 which performs the thickness calculation (H−L) and displays the result as indicated at 20. The actual pipe thickness value can be read on a gauge, or as a digital display, and the test values are stored in a storage section 21 of microprocessor 12 together with the test location (T1, T2, etc.) where each measurement was made. The stored test values are subsequently downloaded to another device for further data processing. In addition to the above, minimum pipe thickness values M are maintained in a memory module 22, with the value for the pipe material being tested also being provided to the microprocessor. When the microprocessor determines actual pipe thickness H, it compares that value against the minimum, and if the measured thickness is less than the minimum, an appropriate indication is given as indicated at 24. Again this information can be presented in analog or digital form and can be downloaded for subsequent data processing. Finally, instrument 10 is capable of switching back and forth between the two measurements at a rate of, for example, 50–500 times per second. For each set of coating and actual pipe thickness readings, the corrected thickness value is displayed. To facilitate the testing, probes B1–B4 are built into the same housing and their measuring points are coincidental.

What has been described is a method and apparatus for quickly, reliably, and accurately measuring the thickness of a pipe covered with a layer of coating material. The measurement, which is made without the need of special tools or equipment, determines if a pipe is still usable, or needs to be replaced. By use of time of flight (TOF) measurements for an ultrasonic pulse through the coated pipe, in addition to ultrasonic thickness measurements of the coated pipe, a thickness value for the layer of coating material is obtained, and this is used to correct the overall thickness measurement to obtain an accurate thickness reading. The method and apparatus of the invention are usable regardless of the type of metal from which the pipe is made, and the type of coating applied to the pipe. It is also immaterial whether the pipe has a number of layers of coating and the layers are of different coating materials.

An instrument including a microprocessor and appropriate memory capability is utilized to perform the tests and to provide appropriate readouts to a technician performing the pipe thickness tests. In addition to a real time display of the pipe thickness at selected test locations, the data produced is stored in the instrument for subsequent downloading for post-test analysis.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

I claim:

1. A method of measuring the thickness of a coated material comprising:

ultrasonically measuring the thickness of the coating on said coated material;

ultrasonically measuring the thickness of the coated material; and, calculating the thickness of just the material by subtracting the measured thickness of the coating from the measured thickness of the coated material.

2. The method of claim 1 wherein ultrasonically measuring the thickness of said coating comprises measuring the velocity of an ultrasonic pulse transmitted through the coated material.

3. The method of claim 2 wherein the velocity of an ultrasonic pulse transmitted through the uncoated material is measured, and the thickness of the coating of said coated material is determined by calculating the difference in velocity of ultrasonic pulse transmission through the uncoated material and the coated material.

4. The method of claim 3 further including comparing the calculated thickness of said material against a predetermined thickness value and providing an indication if the calculated thickness is less than said predetermined value.

5. A method of measuring the thickness of a coated pipe comprising:

measuring the velocity by which an ultrasonic pulse is transmitted through uncoated material from which the pipe is manufactured;

measuring the velocity by which an ultrasonic pulse is transmitted through the coated pipe;

determining the thickness of the coating on the pipe as a function of the difference in transmission velocities;

ultrasonically measuring the thickness of the coated pipe; and, calculating the thickness of just the pipe by subtracting the measured thickness of the coating from the measured thickness of the coated pipe.

6. The method of claim 5 further including measuring the thickness of the coated pipe at a plurality of locations along a length of the coated pipe, each separate measurement including:

measuring the velocity by which an ultrasonic pulse is transmitted through a layer of coating on the coated pipe at that location;

determining the thickness of the layer of coating as a function of the difference in velocities by which an ultrasonic pulse is transmitted through said uncoated pipe material and through said coated pipe at that location;

ultrasonically measuring the thickness of the coated pipe at that location; and, subtracting the measured thickness of the layer of coating at that location from the measured thickness of the coated pipe at that location to determine the thickness of the pipe at that location.

7. The method of claim 5 further including comparing the calculated thickness of said pipe against a predetermined thickness value and providing an indication if the measured thickness of the pipe is less than said predetermined value.

8. The method of claim 7 further including providing a schedule of pipe materials and the velocity of transmission of an ultrasonic pulse through a pipe made of each of the materials and accessing said schedule prior to performing thickness measurements on a coated pipe to obtain the transmission velocity of an ultrasonic pulse through the coated pipe being tested.

9. The method of claim 8 further including automatically calculating the thickness of a layer of coating on the pipe at each location along a length of the coated pipe where pipe thickness is measured.

10. The method of claim 9 further including automatically calculating the thickness of the pipe at each location where the thickness of the pipe is measured.

11. The method of claim 10 further including visually displaying the thickness of the pipe at that location.

12. The method of claim 11 further including downloading the pipe thickness values for each location where pipe thickness is measured for subsequent data processing.

13. Apparatus for measuring the thickness of a coated material comprising:

means ultrasonically measuring the thickness of the coating on said coated material;

means ultrasonically measuring the thickness of the coated material; and, a processor calculating the thickness of the material by subtracting the measured thickness of the coating from the measured thickness of the coated material to determine the thickness of the material.

14. The apparatus of claim 13 further including a display displaying the calculated thickness of the material.

15. The apparatus of claim 13 wherein said processor further compares the calculated thickness of the material against a predetermined minimum thickness value and provides an indication if the material thickness is less than the predetermined value.

16. Apparatus measuring the thickness of a coated pipe comprising:

means transmitting an ultrasonic pulse through uncoated material from which the pipe is manufactured and measuring the velocity by which said ultrasonic pulse is transmitted therethrough;

means transmitting an ultrasonic pulse through the coated pipe and measuring the velocity by which said ultrasonic pulse is transmitted therethrough;

a processor determining the thickness of the coating on the pipe as a function of the difference in transmission velocities; and, means ultrasonically measuring the thickness of the coated pipe, said processor further calculating the thickness of just the pipe by subtracting the measured thickness of the coating from the measured thickness of the coated pipe.

17. The apparatus of claim 16 further including a display displaying the calculated thickness of the material.

18. The apparatus of claim 17 wherein said processor further compares the calculated thickness of the material against a predetermined minimum thickness value and provides an indication if the material thickness is less than the predetermined value.

19. An instrument for measuring the thickness of a coated pipe comprising:

a memory storing a schedule of velocity values for ultrasonic pulses transmitted through an uncoated material from which a pipe whose thickness is to be measured is manufactured, a user of said instrument accessing velocity information for a particular pipe material prior to performing a thickness measurement;

means transmitting an ultrasonic pulse through the coated pipe and measuring the velocity by which said ultrasonic pulse is transmitted therethrough;

a processor to which velocity information is supplied from said memory, said processor determining the thickness of the coating on the pipe as a function of the difference in stored velocity value for the uncoated pipe material and the measured velocity through the coated pipe material;

means ultrasonically measuring the thickness of the coated pipe; and, said processor calculating the thickness of the pipe by subtracting the measured thickness of the coating from the measured thickness of the coated pipe.

20. The instrument of claim 19 further including a display displaying pipe thickness values.

21. The instrument of claim 20 further including means storing minimum thickness values for pipes tested with the instrument, a minimum thickness value for the particular pipe being provided to said processor, said processor comparing a thickness value of the pipe with the minimum thickness value supplied to the processor and providing an indication if the thickness value is less than the minimum.

22. The instrument of claim 21 wherein said processor stores the measured thickness values for downloading the values to other processing equipment for further processing of the measurement values.

23. The instrument of claim 22 wherein said processor stores both the measurement values and the location where each measurement was made.

* * * * *